Patented Dec. 22, 1931

1,837,837

UNITED STATES PATENT OFFICE

WILLIAM L. RINTELMAN, OF MILWAUKEE, WISCONSIN, ASSIGNOR, BY MESNE ASSIGNMENTS, TO E. I. DU PONT DE NEMOURS & COMPANY, A CORPORATION OF DELAWARE

ANTHRAQUINONE BODIES AND PROCESS OF PREPARING THE SAME

No Drawing. Application filed July 2, 1928. Serial No. 290,046.

This invention relates to N substituted 2.6-diamino-1.5-dichloro anthraquinones and to a process of making the same.

It is an object of this invention to provide a method for preparing the N substituted 2.6-diamino-1.5-dichloro-anthraquinones in an economically practical manner, as it has been found that these products are valuable materials when used for the preparation of dyestuffs.

Other and further important objects of this invention will become apparent from the following description and appended claims.

In the German Patent No. 199,758 there is described a process for the chlorination of acetyl amino anthraquinones in which it is stated that beta-amino-anthraquinone is chlorinated to 1-chloro-2-amino-anthraquinone and that only one atom of chlorine enters the molecule. It is further stated in connection with the chlorination of acidyl amino anthraquinones that, according to the process described in the patent, only one atom of chlorine enters the molecule for each of the acidyl amino groups present.

I have now found that the chlorination of acidyl amino anthraquinones may be run in such a manner that more than one atom of chlorine enters the molecule for each amino group, depending upon the excess of chlorinating agent employed. In order to effect a chlorination of diacetylated 2.6-diamino-anthraquinone, for instance, to obtain 2.6-di-(acetyl amino) 1.5-dichloro-anthraquinone in an economical manner in accordance with my invention, it has been found advisable to use a limited quantity of chlorine, since an excess tends to introduce more than two atoms of chlorine.

I have further found that in the chlorination of N substituted diamino anthraquinones, although the chlorination will take place without an added catalyzer, the addition of small amounts of iodine appears to give better results.

The extent to which the chlorination has taken place is determined by taking a test sample and determining the exact percentage of chlorine which has entered the ring. When this amount is equal to between 18 and 19%, sufficient chlorine has been introduced to correspond to the dichloro derivative.

In general, such acidyls may be employed which do not chlorinate appreciably in the acidyl radical such as acetyl ($-CO-CH_3$), urethyl $$(-CO-OC_2H_5),$$

oxalyl $$(-CO-COOH)$$

and the like. My invention is intended to include other nitrogen substituents such as benzoyl

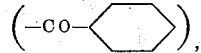, phthaloyl

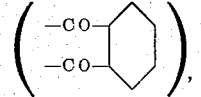, toluene sulfonyl

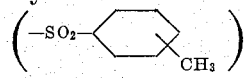

and the like, benzylidene

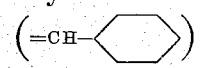

and urea forming residues ($-CO-NH-R$) but because of the fact that in some cases using these substituents chlorination takes place in the radical, especial precaution is necessary to obtain a proper dichlorination on the anthraquinone nucleus, so that these derivatives are less desirable.

The chlorination runs smoothly when the anthraquinone body is dissolved or suspended in medium such as acetic acid at ordinary temperatures or with slightly above ordinary temperatures as for example, 35 to 40° C. In working at higher temperatures complications are introduced, possibly due to hydrochloric acid being generated. This can be overcome to some extent by the use of neutralizing agents, such as sodium acetate, sodium carbonate and the like. In the place of chlorine as such for the chlorination, other chlorinating agents, as for example, sodium hypochlorite and hydrochloric acid may be used, but they are not to be preferred. During the step of chlorinating in acetic acid with chlorine, an intermediate product, possibly a nitrogen chloride, may be isolated as such and transformed as such after isolation.

The N-substituted 2.6-diamino-1.5-dichloro anthraquinones are in general similar to 2.6-di-(acetyl amino)-1.5-dichloro anthraquinone, which has the following characteristics: It is a yellow solid, sparingly soluble in warm acetic acid, less so in cold acetic acid and practically insoluble in water. It is soluble in concentrated sulfuric acid, imparting thereto a greenish coloration (probably due to traces of the intermediate nitrogen-chloride compound above referred to), but insoluble in diluted acids and alkalies. It can be hydrolyzed by methods applicable to the hydrolysis of similar bodies to 2.6-diamino-1.5-dichloro anthraquinone. The 2.6-di-(acetyl amino)-1.5-dichloro anthraquinone does not melt below 300° C.

Without limiting my invention to any particular procedure, the following example in which parts by weight are given, will serve to illustrate my method in its preferred form.

*Example*

Add 10 parts of 2.6-diamino anthraquinone to 30 parts of glacial acetic acid and 10 parts of acetic anhydride. Upon heating to the boiling point, the body is transformed into the di-(acetyl amino) derivative. It is then cooled and to it are added 60 parts of glacial acetic acid and 30 parts of sodium acetate (crystals) and $\frac{1}{10}$ part of iodine. Pass in chlorine at a temperature of about 35 to 40° C. until a test portion isolated indicates a chlorine content corresponding to 18 to 19% chlorine. The mass is then agitated at 35 to 40° C. till the chlorination to the 1.5-position is practically completed. From time to time samples are taken and the chlorine analysis on an isolated portion checked up for chlorine content. The finished test should show 18 to 19% chlorine content, otherwise more chlorine should be passed in. Upon completion of the chlorination, the mass is filtered at 25 to 30° C. and washed with about 50 parts of glacial acetic acid and with some hot water to remove the inorganic residues. It is then dried. The 2.6-di (acetyl amino) 1.5-dichloro-anthraquinone may be hydrolyzed to 2.6-diamino-1.5-dichloro anthraquinone by known methods for hydrolyzing similar bodies.

Other 2.6-di-(acidyl amino) anthraquinones may be chlorinated in a similar manner to produce 2.6-di-(acidyl amino)-1.5-dichloro anthraquinones which may be used for similar purposes as the diacetyl body described.

I am aware that numerous details of the process may be varied through a wide range without departing from the principles of this invention, and I, therefore, do not purpose limiting the patent granted hereon otherwise than necessitated by the prior art.

I claim as my invention:

1. The process of preparing an N substituted 2.6-diamino-1.5-dichloro anthraquinone, which comprises chlorinating 2.6-di-(acidyl amino) anthraquinone until chlorination to the 1.5-position is practically complete.

2. The process of preparing 2.6-di-(acetyl amino)-1.5-dichloro anthraquinone, which comprises chlorinating 2.6-di-(acetyl amino) anthraquinone until chlorination to the 1.5-position is practically complete.

3. The process of preparing 2.6-di-(acetyl amino) 1.5-dichloro anthraquinone, which comprises chlorinating 2.6-di-(acetyl amino) anthraquinone at a temperature of about 35 to 40° C. in glacial acetic acid in the presence of sodium acetate and iodine until chlorination to the 1.5 position is practically complete.

4. The process of preparing 2.6-di-(acetyl amino)-1.5-dichloro anthraquinone, which comprises acetylating 2.6-diamino anthraquinone in glacial acetic acid and acetic acid anhydride and without isolation of the intermediate product passing chlorine into the solution in the presence of sodium acetate and iodine at a temperature of about 35 to 40° C. until chlorination to the 1.5 position is practically complete.

5. As new articles of manufacture, 2.6-di-(acidyl amino)-1.5-dichloro anthraquinones.

6. As new articles of manufacture, 2.6-di-(acetyl amino)-1.5-dichloro anthraquinone of the following formula:

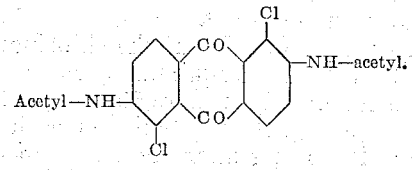

In testimony whereof I have hereunto subscribed my name at Carrollville, Milwaukee County, Wisconsin.

WILLIAM L. RINTELMAN.